United States Patent
Oh et al.

(10) Patent No.: US 9,475,931 B2
(45) Date of Patent: Oct. 25, 2016

(54) WATER-DISPERSIBLE HALOGEN-CAPPING POLYALKYLACRYLATE, VINYL CHLORIDE-BASED BLOCK COPOLYMER AND METHOD FOR PREPARING THE SAME

(71) Applicant: LG CHEM, LTD., Seoul (KR)

(72) Inventors: Kyoung Shil Oh, Daejeon (KR); Bo Hee Park, Daejeon (KR); Kyung Hyun Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 19 days.

(21) Appl. No.: 14/346,259

(22) PCT Filed: Jun. 3, 2013

(86) PCT No.: PCT/KR2013/004872
§ 371 (c)(1),
(2) Date: Mar. 20, 2014

(87) PCT Pub. No.: WO2013/183895
PCT Pub. Date: Dec. 12, 2013

(65) Prior Publication Data
US 2014/0235762 A1     Aug. 21, 2014

(30) Foreign Application Priority Data

| Jun. 4, 2012 | (KR) | 10-2012-0059585 |
| Sep. 4, 2012 | (KR) | 10-2012-0097419 |
| Sep. 11, 2012 | (KR) | 10-2012-0100217 |
| Feb. 28, 2013 | (KR) | 10-2013-0021854 |

(51) Int. Cl.
| C08L 33/16 | (2006.01) |
| C08F 214/08 | (2006.01) |
| C08L 33/08 | (2006.01) |
| C08F 2/18 | (2006.01) |
| C08F 293/00 | (2006.01) |

(52) U.S. Cl.
CPC ............. C08L 33/08 (2013.01); C08F 2/18 (2013.01); C08F 214/08 (2013.01); C08F 293/005 (2013.01); C08L 33/16 (2013.01); C08F 2438/00 (2013.01)

(58) Field of Classification Search
CPC ...... C08L 33/08; C08L 53/00; C08F 214/08; C08F 2/18
See application file for complete search history.

(56) References Cited

U.S. PATENT DOCUMENTS

| 6,713,548 | B1 | 3/2004 | Zhang et al. |
| 2002/0173611 | A1 | 11/2002 | Percec et al. |
| 2003/0078353 | A1 | 4/2003 | Percec et al. |
| 2005/0131186 | A1* | 6/2005 | Percec et al. ............ 526/344 |
| 2007/0218207 | A1* | 9/2007 | Fringant et al. ............ 427/331 |
| 2009/0203827 | A1 | 8/2009 | Claassen et al. |

FOREIGN PATENT DOCUMENTS

| JP | 2005-060505 A | 3/2005 |
| KR | 10-0463020 B1 | 12/2004 |

OTHER PUBLICATIONS

Coelho et al. European Polymer Journal 42 (2006) 2313-2319.*
Virgil Percec et al: "Synthesis of poly(methyl methacrylate)-b-poly(vinylchloride)-b-poly(methyl methacrylate) block copolymers by CuCl/2,2?-bipyridine-catalyzed living radical block copolymerization initiated from di(iodo)poly (vinyl chloride) prepared by single-electron-transfer/degenerative-chaffn-transfer mediated",Journal of Polymer Science Part A: Polymer Chemistry,vol. 43, No. 7, Apr. 1, 2005 (Apr. 1, 2005), pp. 1478-1486, XP055120749, ISSN: 0887-624X, DOI: 10.1002/pola.20604.
Percec Virgil et al: "Accelerated synthesis of poly(methylmethacrylate)-b-poly(vinylchloride)-b-poly (methylmethacrylate) block copolymers by the CuCl /tris(2-dimethylaminoethyl)amine-catalyzed living radical block copolymerization of methylmethacrylate initiated with.alpha.,.omega.-di(iodo)poly(vinylchloride) in d",Journal of Polymer Science Part A: Polymer Chemistry, John Wiley & Sons, Inc, US, vol. 43, No. 8, Jan. 1, 2005 (Jan. 1, 2005), pp. 1649-1659, XP009093726, ISSN: 0887-624X, DOI: 10.1002/POLA.20616.
Lacroix-Desmazes, et al, Reverse Iodine Transfer Polymerization of Methyl Acrylate and n-Butyl Acrylate, Macromolecules, Jul. 26, 2005, pp. 6299-6309, vol. 38.
Percec, et al, Acceleration of the Single Electron Transfer-Degenerative Chain Transfer Mediated Living Radical Polymerization (SET-DTLRP) of Vinyl Chloride in Water at 25° C., Journal of Polymer Science: Part A: Polymer Chemistry, Aug. 19, 2004, pp. 6364-6374, vol. 42.

* cited by examiner

*Primary Examiner* — Mark Kaucher
(74) *Attorney, Agent, or Firm* — Dentons US LLP

(57) ABSTRACT

Disclosed are a water-dispersible halogen-capping polyalkylacrylate, a vinyl chloride-based block copolymer and a method for preparing the same. By using the water-dispersible halogen-capping polyalkylacrylate derivative as a chain transfer agent for polymerization of a vinyl chloride-based monomer, it is possible to obtain effects such as reduction of coagulation of particles and adhesion of particles to a reactor wall, improvement in reaction efficiency and polydispersity index, and prevention of yellowing.

12 Claims, 4 Drawing Sheets

WATER-DISPERSIBLE HALOGEN-CAPPING POLYALKYLACRYLATE, VINYL CHLORIDE-BASED BLOCK COPOLYMER AND METHOD FOR PREPARING THE SAME

This application is a National Stage Application of International Application No. PCT/KR2013/004872, filed Jun. 3, 2013 and claims priority to and the benefit of Korean Patent Application No. 10-2012-0059585, filed on Jun. 4, 2012, Korean Patent Application No. 10-2012-0097419, filed on Sep. 4, 2012, Korean Patent Application No. 10-2012-0100217, filed on Sep. 11, 2012, and Korean Patent Application No. 10-2013-0021854, filed on Feb. 28, 2013, the disclosures of which are incorporated herein by reference in their entirety.

TECHNICAL FIELD

The present invention relates to a water-dispersible halogen-capping polyalkylacrylate, a vinyl chloride-based block copolymer and a method for preparing the same. More specifically, the present invention relates to a water-dispersible halogen-capping polyalkylacrylate which reduces coagulation of particles and adhesion thereof to a reactor wall, improves reaction efficiency and polydispersity index, and prevents yellowing, when used as a chain transfer agent for polymerization of a vinyl chloride-based monomer, a vinyl chloride-based block copolymer and a method for preparing the same.

BACKGROUND ART

A halogen-capping polyalkylacrylate is used as a chain transfer agent for producing a block copolymer through polymerization with a vinyl chloride-based monomer.

As a preparation method of a halogen-capping polyalkylacrylate, US Patent Publication No. 2002-0173611 (published on Nov. 21, 2002) discloses living radical polymerization of vinyl halides using a metal (for example, Cu).

As another preparation method of halogen-capping polyalkylacrylate, there is single electron transfer-degenerative chain transfer (SET-DT) (Journal of Polymer Science Part A: Polymer Chemistry, Vol. 42, Issue 24, pages 6364-6374, 15 Dec. 2004, entitled "Acceleration of the single electron transferdegenerative chain transfer mediated living radical polymerization (SETDTLRP) of vinyl chloride in water at 25° C.").

In accordance with the SET-DT reaction, a polymer controlled during polymerization can be obtained by forming an alkyl iodine radical (I-PBA*) from a produced $SO_2^*$ radical and a detailed reaction scheme is as follows:

$Na_2S_2O_4$ mediated SET-LRP

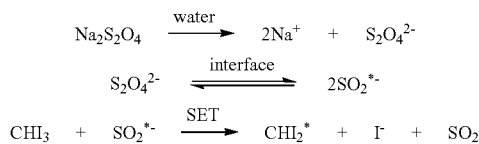

When the halogen-capping polyalkylacrylate is used as a chain transfer agent for vinyl chloride-based monomers, since a glass transition temperature is −48° C. and stickiness is excessively high (see FIG. 1A), many problems such as aggregation between halogen-capping polyalkylacrylate particles and thus occurrence of particle coagulation (see FIG. 2A), and decrease in reaction efficiency and thus non-free reaction due to high amount of particles adhered to the wall of a reactor occur.

Therefore, there is a need for development of a method which easily solves excessively high stickiness of halogen-capping polyalkylacrylate.

DISCLOSURE

Technical Problem

Therefore, it is one object of the present invention to provide a water-dispersible derivative effective in reducing excessively high stickiness of halogen-capping polyalkylacrylate.

It is another object of the present invention to provide a block copolymer using the derivative as a chain transfer agent for polymerization of a vinyl chloride-based monomer and a method for preparing the same.

Technical Solution

In accordance with one aspect of the present invention, the above and other objects can be accomplished by the provision of a water-dispersible halogen-capping polyalkylacrylate comprising a halogen-capping polyalkylacrylate and having a controlled mean particle diameter of 0.1 to 1 μm.

In accordance with another aspect of the present invention, provided is a vinyl chloride-based block copolymer produced by block-copolymerizing the water-dispersible halogen-capping polyalkylacrylate as a chain transfer agent with a vinyl chloride-based monomer.

In accordance with another aspect of the present invention, provided is a method for preparing a vinyl chloride-based block copolymer comprising: (a) preparing a water-dispersible halogen-capping polyalkylacrylate by controlling a mean particle diameter of a halogen-capping polyalkylacrylate to 0.1 to 1 μm; and (b) forming a block copolymer by polymerizing a vinyl chloride-based monomer using the water-dispersible halogen-capping polyalkylacrylate as a chain transfer agent.

Advantageous Effects

The present invention provides a water-dispersible halogen-capping polyalkylacrylate which advantageously reduces coagulation of particles and adhesion of particles to the wall of a reactor, induces uniform diffusion into vinyl chloride-based monomer droplets (VCM droplets), improves reaction efficiency and polydispersity index of the vinyl chloride-based block copolymer and prevents yellowing, when used as a chain transfer agent for polymerization of the vinyl chloride-based monomer.

DESCRIPTION OF DRAWINGS

FIG. 1B shows a stickiness lower than Example 1 of FIG. 1A;

BEST MODE

Figure 1:
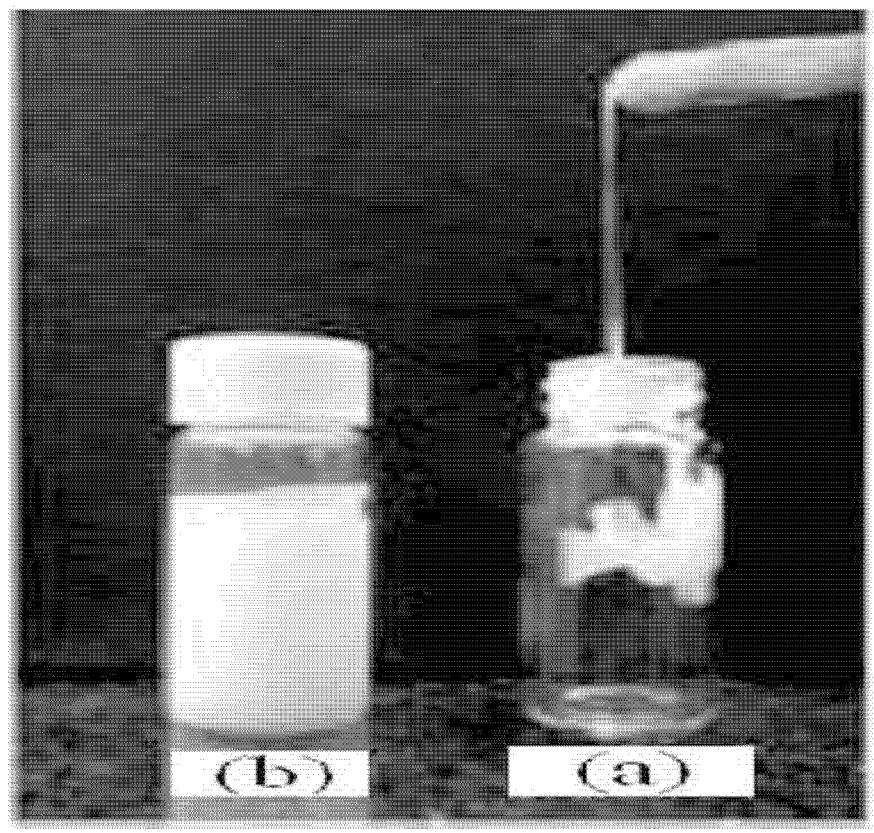
FIG. 1 is an image showing comparison in stickiness between a halogen capping polyalkylacrylate of Preparation Example and a water-dispersible halogen capping polyalkylacrylate of Example 1.

Hereinafter, the present invention will be described in detail.

In one aspect, the present invention provides a water-dispersible halogen-capping polyalkylacrylate comprising a halogen-capping polyalkylacrylate as a stickiness-associated water-dispersible derivative and having a controlled mean particle diameter of 0.1 to 1 μm.

The water-dispersible halogen-capping polyalkylacrylate has a mean particle diameter of 0.1 to 1 μm, preferably 0.3 to 0.7 μm.

The water-dispersible halogen-capping polyalkylacrylate comprises 5 to 70% by weight of halogen-capping polyalkylacrylate and 95 to 30% by weight of water.

The polyalkylacrylate may contain an alkyl group having 1 to 10 carbon atoms. Specifically, the alkyl group may be at least one selected from methyl, ethyl, propyl, butyl, tert-butyl, and 2-ethylhexyl.

The halogen may be fluorine, chlorine, bromine, iodine and the like, and may be for example iodine. The halogen-capping may be at least one of monoiodine-capping and diiodine-capping and may be for example diiodine-capping.

The water-dispersible halogen-capping polyalkylacrylate has a number average molecular weight (Mn) of 1,000 to 50,000 g/mol, preferably 10,000 to 35,000 g/mol.

In another aspect, the present invention provides a vinyl chloride-based block copolymer by block copolymerizing the water-dispersible halogen-capping polyalkylacrylate as a chain transfer agent with a vinyl chloride-based monomer.

The vinyl chloride-based block copolymer may comprise a vinyl chloride block having a Mw of 5,000 to 95,000 and an alkyl acrylate block having a Mw of 1,000 to 50,000.

A weight ratio of the vinyl chloride block to the alkyl acrylate block is 50:50 to 95:5. For example, the vinyl chloride-based block copolymer is a tri-block copolymer in which an alkyl acrylate block is formed between vinyl chloride blocks.

The block copolymer has a polydispersity index (PDI) of 1.5 to 6.0, or 1.5 to 3.0, and a number average molecular weight (Mn) constituting the polydispersity index of 10,000 to 100,000 g/mol, or 30,000 to 80,000 g/mol.

The block copolymer has a glass transition temperature (Tg) of 10 to 90° C.

The block copolymer is for example prepared by the following method.

First, a water-dispersible halogen-capping polyalkylacrylate is prepared by controlling a mean particle diameter of halogen-capping polyalkylacrylate to 0.1 to 1 μm (hereinafter, referred to as "step (a)").

A vinyl chloride-based monomer is polymerized using the water-dispersible halogen-capping polyalkylacrylate of step (a) as a chain transfer agent to produce a block copolymer (hereinafter, referred to as "step (b)").

In step (a), a nanometer (nm) scale emulsion may be formed by mixing the halogen-capping polyalkylacrylate, water and a dispersing agent.

A weight ratio of the halogen-capping polyalkylacrylate to water is for example 0.2:1 to 0.6:1, or 0.25:1 to 0.5:1. For reference, when water content is excessively high or low, mixing efficiency may be decreased during application of a high-shear homogenization machine.

The mixing is carried out using a high-shear homogenization machine, any high-shear homogenization machine may be used without limitation so long as it is well-known in the art and, for example, the high-shear homogenization machine is a homogenizer.

The mixing is carried out at 2,000 to 10,000 rpm, or 6,000 to 10,000 rpm. In addition, the mixing is carried out for 5 to 15 minutes, or 8 to 12 minutes. For reference, when the mixing time is less than 5 minutes, sufficient water-dispersion cannot be obtained and, when the mixing time is longer than 15 minutes, a halogen element may be cleaved from the halogen-capping polyalkylacrylate or the polymer chain may be broken.

The dispersing agent provides optimal efficiency when mixing is carried out using a high-speed homogenizer, and may be, for example, at least one selected from a vinyl alcohol-based resin, cellulose and an unsaturated organic acid polymer.

The vinyl alcohol-based resin has a hydration degree of 30 to 90% by weight and a 4% aqueous solution of the vinyl alcohol-based resin at 15 to 25° C. has a viscosity of 10 to 60 cPs.

The cellulose contains 3 to 20% by weight of a hydroxypropyl group, and a 2% aqueous solution of the cellulose at 15 to 25° C. has a viscosity of 10 to 20,000 cPs.

The unsaturated organic acid polymer may be, for example, at least one selected from an acrylic acid polymer, a methacrylic acid polymer, an itaconic acid polymer, a fumaric acid polymer, a maleic acid polymer, a succinic acid polymer, and gelatin.

An amount of the dispersing agent used may be controlled according to grade depending on the final application purpose and is for example 1 to 30% by weight with respect to the total weight of materials used for mixing. Within this range, deterioration in droplet stability and significant deterioration of protrusion properties based on the formation of bead can be prevented.

In step (b), polymerization may be carried out by adding water, a catalyst and a vinyl chloride-based monomer to an aqueous solution in which the water-dispersible halogen capping polyalkylacrylate of step (a) is dispersed.

An amount of the water-dispersible halogen capping polyalkylacrylate used may be, for example, 1 to 100% by weight, 1 to 50% by weight, or 5 to 40% by weight, based on 100% by weight of the vinyl chloride-based monomer.

For example, the catalyst may be at least one selected from diacyl peroxides, peroxydicarbonates, sulfates and azo compounds.

The diacylperoxide may be at least one selected from dicumyl peroxide, dipentyl peroxide, di-3,5,5-trimethyl hexanoyl peroxide and dilauryl peroxide.

The peroxydicarbonate may be at least one selected from diisopropyl peroxydicarbonate, di-sec-butylperoxydicarbonate and di-2-ethylhexyl peroxydicarbonate.

The azo compound is for example azobis-2,4-dimethylvaleronitrile.

The sulfate is for example at least one selected from $Na_2S_2O_4$, $H_2NC(=NH)SO_2H$, $HOCH_2SO_2Na$, $HOCH_2SO_3Na$, $Na_2SO_3$, $Na_2S_2O_5$, $Na_2S_2O_3$, $CH_3SO_2Na$, $C_6H_5SO_2Na$, and p-$CH_3C_6H_4SO_2Na$.

The catalyst may be used in the presence of a buffer and is for example at least one selected from $NaHCO_3$, Na$_2$HPO$_4$, NaH$_2$PO$_4$, CH$_3$COONa, KHCO$_3$, K$_2$HPO$_4$, KH$_2$PO$_4$, CH$_3$COOK, NH$_4$HCO$_3$, (NH$_4$)HPO$_4$, NH$_4$H$_4$PO$_4$, and CH$_3$COONH$_4$.

An amount of the buffer used may be determined so long as pH of a polymerization solution can be adjusted to 8 to 10.

In another example, the catalyst may be a peroxyester. The peroxyester may be at least one selected from t-butyl peroxypivalate, t-butyl peroxyneodecanoate and hydroxy dimethylbutyl peroxyester.

The catalyst may be used in the presence of a dispersing agent and the dispersing agent may be at least one selected from a vinyl alcohol-based resin, cellulose and an unsaturated organic acid polymer.

In step (b), an amount of the catalyst used may be 0.02 to 5% by weight, or 0.1 to 3% by weight, based on 100% by weight of the vinyl chloride-based monomer.

The polymerization is for example carried out by suspension polymerization, emulsion polymerization or seed emulsion polymerization under reaction conditions of 20 to 90° C., or 35 to 80° C.

In another example, the suspension polymerization may be carried out for 1 to 30 hours, or 1 to 24 hours.

In another example, the suspension polymerization may be carried out by further adding a dispersing agent and adding the at least one catalyst selected from diacylperoxides, peroxydicarbonates, peroxyesters, sulfates and azo compounds.

The polymerization may be carried out for 1 to 30 hours or 1 to 20 hours.

The block copolymer according to the present invention may be exclusively used in the form of a resin with improved processability and impact strength as a thermoplastic elastomer and may be also used as an impact strength enhancer, a comonomer, or a modifier contained in PVC resins.

EXAMPLE

Preparation Example

Preparation of Diiodine-Capping Polybutylacrylate (Referred to as "Di-Iodo Capping PBA")

150 g of butyl acrylate (Aldrich, purity 99%), 4.65 g of Iodoform (CHI$_3$) (for preparation of di-iodo capping PBA having Mn of 10,000) or 1.86 g of Iodoform (CHI$_3$) (for preparation of di-iodo capping PBA having Mn of 35,000) as a polymerization initiator, 9.58 g of Na$_2$S$_2$O, 1.43 g of NaHCO$_3$, and 5.65 g of a 2% cellulose aqueous solution were polymerized at 35° C. for 2 hours to produce two types of di-iodo capping PBAs having number average molecular weights of 10,000 and 35,000, respectively (polymerization conversion ratio: 90%).

Glass transition temperatures of the obtained two di-iodo capping PBAs measured with DSC (differential scanning calorimetry) were −48° C. and were highly sticky (FIG. 1A). In addition, measurement of particle diameter of di-iodo capping PBAs was impossible due to high viscosity.

Example 1

Preparation of Water-Dispersible Diiodine-Capping Polybutylacrylate 300 g of water and 135 g of the iodine-capping polybutylacrylate (Mn of 10,000) obtained in Preparation Example were added to a 5 L homogenizer, and 55.86 g of a 5% polyvinylalcohol aqueous solution having a hydration degree of 88% and 64.40 g of a 2% cellulose aqueous solution were added as a dispersing agent thereto, followed by stirring at a high speed of 6,000 to 10,000 rpm for 10 minutes to prepare a water-dispersible iodine-capping polybutylacrylate.

A mean particle diameter of the obtained water-dispersible iodine-capping polybutylacrylate was measured using a particle size analyzer. As a result, the mean particle diameter was 400 nm. It was seen from an image shown in FIG. 1B that the water-dispersible iodine-capping polybutylacrylate was well dispersed in water due to small particle size and was decreased in stickiness.

For reference, the glass transition temperature (Tg) was −48° C.

(Preparation of Block Copolymer)

1,700 g of deionized water and 135 g of the water-dispersible iodine capping-polybutylacrylate (Mn of 10,000) were added to a 5 L high-pressure suspension polymerization reactor, 20.20 g of Na$_2$S$_2$O$_4$ as a catalyst and 1.77 g of NaHCO$_3$ as a buffer were added thereto, vacuum was applied thereto, 800 g of a vinyl chloride monomer was added thereto, an initial reaction temperature of polymerization was increased to 42° C., and suspension polymerization was performed while the temperature was maintained throughout the polymerization process.

When the polymerization reactor pressure was decreased in 1.0 kg/cm$^2$, reaction was ceased, an unreacted vinyl chloride monomer was collected and a polymer slurry was collected from the polymerization reactor. The obtained slurry was dried in a convection oven for 20 hours to obtain 750 g of a PVC-PBA-PVC triblock copolymer.

Figure 2:
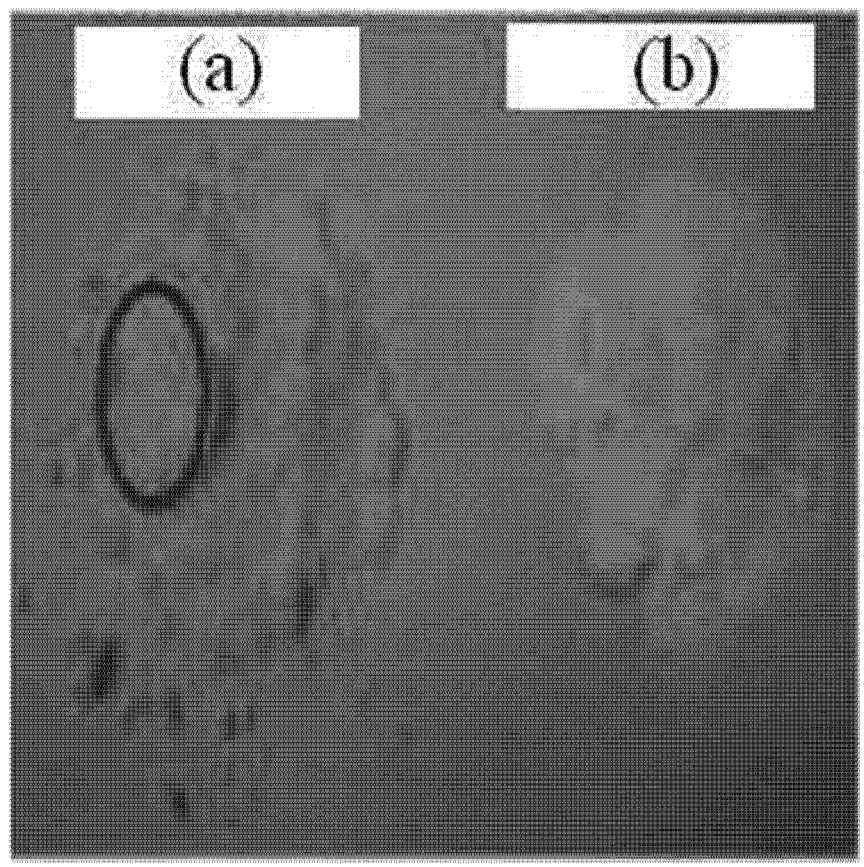
FIG. 2 is an image showing comparison in powder coagulation between block copolymers obtained using a halogen capping polyalkylacrylate of Comparative Example 1 or the water-dispersible halogen capping polyalkylacrylate of Example 1 as chain transfer agents, and Example 1 of FIG. 2B does not exhibit powder coagulation, as compared to Comparative Example 1 of FIG. 2A (Powder coagulation)

As shown in FIG. 2B, regarding particles after drying, neither particle coagulation (aggregation) nor discoloration was observed. Furthermore, it could be seen from the measurement results of FTIR and 500-MHz $^1$H NMR that the triblock copolymer comprised a polyvinyl chloride block and a polybutylacrylate block.

Figure 3:
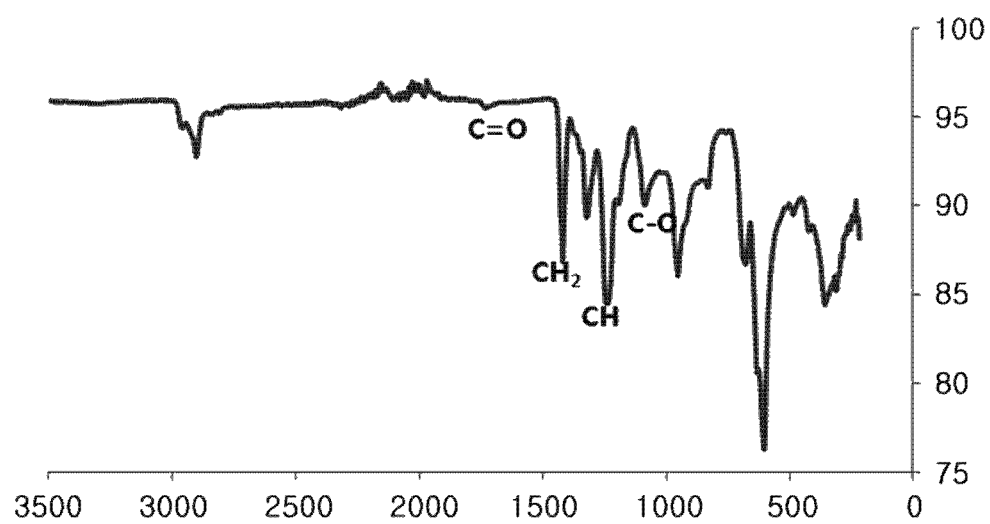
FIGS. 3 and 4 show IR and NMR of the triblock copolymer obtained in Example 1, respectively.

As can be seen from FIG. 3, C=O and C—O peaks of PBA were observed at 1,720 cm$^{-1}$ and 1,160 cm$^{-1}$, respectively, and CH$_2$ and CH peaks of PVC were observed at 1,400 cm$^{-1}$ and 1,240 cm$^{-1}$.

Figure 4:
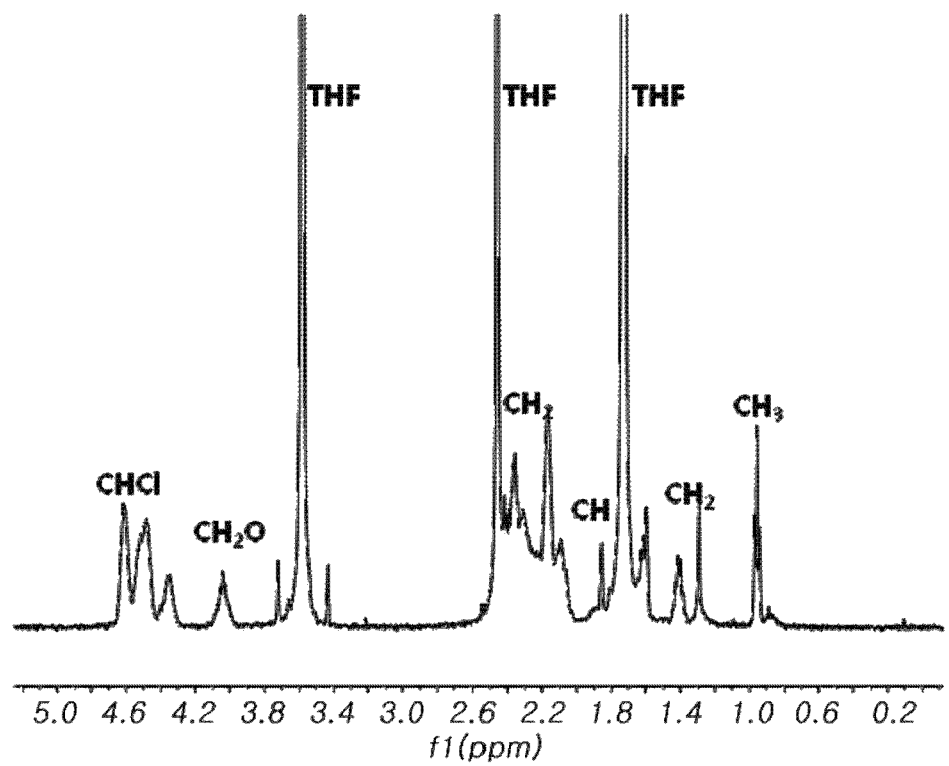

Referring to FIG. 4, CHIC(O)OBu peaks disappeared at 5.0 ppm, which means that PVC polymerization was performed at both ends of polybutylacrylate and peaks of CHCII of a terminal group of the copolymer were hardly observed at about 6 ppm due to increased molecular weight and thus considerably low concentration. Peaks (4.2 and 4.5 ppm) of CHCl of PVC, CH$_2$ (2.0 and 2.5 ppm) of PVC, and CH$_2$O (4 ppm) of PBA were observed, which means that a block copolymer was produced.

In addition, the triblock copolymer had a number average molecular weight (Mn) of 75,000, a PDI (polydispersity index, Mw/Mn) of 2.0 and a glass transition temperature (Tg) of 73.2° C.

Comparative Example 1

Preparation of PBA-Co-PVC without Water-Dispersion Treatment 670 g of a block copolymer was prepared by repeating the same process as in Example 1, except that the iodine-capping polybutylacrylate of Example 1 was used in the step of block copolymer preparation without preparing a water-dispersible iodine-capping polybutylacrylate in Example 1.

During reaction, adhesion of sticky iodine-capping polybutylacrylate to the wall of the reactor was observed by the naked eye. As a result, as shown in FIG. 2A, coagulation (aggregation) of the obtained block copolymer was remarkably observed. As a result of molecular weight measurement, the number average molecular weight (Mn) was 76,000 and PDI (=Mw/Mn) was 4.2. This high PDI value was due to non-uniform dispersion of iodine-capping polybutylacrylate. The block copolymer exhibited low color uniformity and partially yellowed, as compared to Example 1 in which water-dispersion treatment was performed. This was thought to be due to unreacted iodine-capping polybutylacrylate. In addition, the glass transition temperature was 74.9° C.

Comparative Example 2

Preparation of PBA-Co-PVC by Mechanical Stirring in Water 700 g of a triblock copolymer was prepared by repeating the same process as in Example 1, except that a water-dispersible iodine-capping polybutylacrylate was not prepared in Example 1, and water and a dispersing agent were added to the polymerization reactor, followed by pre-mixing at a temperature of 25° C. for 20 minutes at 400 rpm to prepare a block copolymer, in the step of block copolymer preparation.

During polymerization, adhesion of iodine-capping polybutylacrylate to the wall of the reactor was observed by the naked eye. The block copolymer had a number average molecular weight (Mn) of 75,500 and a PDI (=Mw/Mn) of 3.0. In addition, the block copolymer had a glass transition temperature (Tg) of 74.0° C.

Comparing results between Example 1 and Comparative Examples 1-2, Example 1 reduced particle coagulation and amount of particles adhered to the reactor wall, which are generated in Comparative Example 1 in which water-dispersion treatment of iodine capping-polyalkylacrylate was not performed and Comparative Example 2 in which the iodine capping-polyalkylacrylate was subjected to water-dispersion by addition of water and mechanical stirring without using a homogenizer.

In addition, Example 1 exhibited an improved polydispersity index of 2.0, as compared to Comparative Example 1 exhibiting a polydispersity index of 4.2, and Comparative Example 2 exhibiting a polydispersity index of 3.0.

Furthermore, Example 1 had a yield of 750 g, while Comparative Example 1 had a yield of 670 g, and Comparative Example 2 had a yield of 700 g. This means that Example 1 was effective in improving reaction efficiency of the triblock copolymer.

Example 2

1,700 g of deionized water and 40 g of water-dispersible iodine capping polybutylacrylate (Mn of 10,000) obtained in Example 1 were added to a 5 L high-pressure suspension polymerization reactor, and 20.20 g of $Na_2S_2O_4$ as a catalyst, and 1.37 g of t-butylperoxy neodecanoate (BND), as a buffer, instead of 31.77 g of NaHCO were added thereto, and 55.86 g of a 5% polyvinylalcohol aqueous solution having a hydration degree of 88% and 64.40 g of 2% cellulose aqueous solution as a dispersing agent were added thereto, vacuum was applied thereto, 800 g of a vinyl chloride monomer was added thereto, an reactor temperature was increased to 57° C., and suspension polymerization was performed while the temperature was maintained.

A time taken for polymerization was 3 hours. When the polymerization reactor pressure was 1.0 kg/cm² lower than a polymerization pressure, reaction was ceased, a unreacted vinyl chloride monomer was collected, and a polymer slurry was collected from the polymerization reactor and dried in a convection oven for 20 hours to obtain 672 g of a PVC-PBA-PVC triblock copolymer.

During reaction, coagulation of particles in the polymerization reactor and adhesion of particles to the wall thereof were not remarkably observed by the naked eye. Furthermore, it could be seen from IR and NMR results that the PVC-PBA-PVC triblock copolymer comprised a polyvinyl chloride block and a polybutylacrylate block.

In addition, the triblock copolymer had a number average molecular weight (Mn) of 75,000, a PDI (polydispersity index, Mw/Mn) of 2.6 and a glass transition temperature (Tg) of 80.27° C.

Example 3

A water-dispersible iodine capping polybutylacrylate (Mn of 35,000) was obtained using an iodine capping polybutylacrylate having a Mn of 35,000, instead of the iodine capping polybutylacrylate having a Mn of 10,000, in (Preparation of water-dispersible diiodine-capping polybutylacrylate) of Example 1.

Then, the same process as in Example 2 was repeated except that 80 g of the water-dispersible iodine capping polybutylacrylate (Mn of 35,000) was used instead of 40 g of water-dispersible iodine capping polybutylacrylate (Mn of 10,000) of Example 2, followed by polymerization for 3 hours, to obtain 704 g of a PVC-PBA-PVC triblock copolymer.

During reaction, coagulation of particles in the polymerization reactor and adhesion of particles to the wall thereof were not remarkably observed by the naked eye. Furthermore, it could be seen from IR and NMR results that the PVC-PBA-PVC triblock copolymer comprised a polyvinyl chloride block and a polybutylacrylate block. In addition, the triblock copolymer had a number average molecular weight (Mn) of 81,000, a PDI (polydispersity index, Mw/Mn) of 2.2 and a glass transition temperature (Tg) of 78.02° C.

Example 4

Then, the same process as in Example 2 was repeated except that 80 g of the water-dispersible iodine capping polybutylacrylate (Mn of 10,000) was used, instead of 40 g of the water-dispersible iodine capping polybutylacrylate (Mn 10,000) in Example 2, followed by polymerization for 3 hours, to obtain 710 g of a PVC-PBA-PVC triblock copolymer.

During reaction, coagulation of particles in the polymerization reactor and adhesion of particles to the wall thereof were not remarkably observed by the naked eye. Furthermore, it could be seen from IR and NMR results that the PVC-PBA-PVC triblock copolymer comprised a polyvinyl chloride block and a polybutylacrylate block.

In addition, the triblock copolymer had a number average molecular weight (Mn) of 51,000, a PDI (polydispersity index, Mw/Mn) of 2.0 and a glass transition temperature (Tg) of 79.86° C.

Comparative Example 3

The same process as in Example 4 was repeated except that an iodine capping polybutylacrylate (Mn of 10,000)

which had not been subjected to water-dispersion treatment was used, in Example 4, followed by polymerization for 3 hours, to obtain a PVC-PBA-PVC triblock copolymer.

Although the polymerization time was 3 hours, during reaction, coagulation of particles in the polymerization reactor and adhesion of particles to the wall thereof were remarkably observed by the naked eye.

In addition, the triblock copolymer had a number average molecular weight (Mn) of 53,000, a PDI (polydispersity index=Mw/Mn) of 4.1 and a glass transition temperature (Tg) of 80.4° C.

Comparing results of Examples 2 to 4 with Comparative Example 3, Examples 2 to 4 reduced coagulation of particles and adhesion of particles to the reactor wall which were observed in Comparative Example 3. In addition, Example 2 exhibited a polydispersity index of 2.6, Example 3 exhibited a polydispersity index of 2.2 and Example 4 exhibited a polydispersity index of 2.0, while Comparative Example 3 exhibited a polydispersity index of 4.1.

Furthermore, Examples 2 to 4 exhibited a decrease in glass transition temperature, regardless of molecular weight and added amount, as compared to Comparative Example 3 in which a di-iodo capping PBA which had not been subjected to water-dispersion treatment was added. For reference, in Examples 2 and 4 which have the same molecular weight of the water-dispersible di-iodo capping PBA, as amount added increased, the number average molecular weight (Mn) and the glass transition temperature of the triblock copolymer decreased. It was seen that, in Examples 3 and 4 which have the same content of the water-dispersible di-iodo capping PBA, as molecular weight increased, the number average molecular weight (Mn) decreased.

The invention claimed is:

1. A vinyl chloride-based block copolymer prepared by block-copolymerizing a water-dispersible halogen-capping polyalkylacrylate as a chain transfer agent with a vinyl chloride-based monomer,
   wherein the water-dispersible halogen-capping polyalkylacrylate is a water-dispersed emulsion comprising a halogen-capping polyalkylacrylate, water and a dispersing agent, where the halogen-capping polyalkylacrylate, water and the dispersing agent are homogenized at 2,000 to 10,000 rpm to have a nanometer-scale emulsion having a mean particle diameter controlled to 0.1 to 1 μm,
   wherein a content of the water-dispersible halogen capping polyalkylacrylate is 5 to 40% by weight, based on 100% by weight of the vinyl chloride-based monomer, and
   wherein the block copolymer is a tri-block copolymer thermoplastic elastomer having a glass transition temperature (Tg) of 70 to 90° C.

2. The vinyl chloride-based block copolymer according to claim 1, wherein the block copolymer comprises the vinyl chloride block and the alkyl acrylate block in a weight ratio of 50:50 to 95:5.

3. The vinyl chloride-based block copolymer according to claim 1, wherein the block copolymer has a polydispersity index (PDI) of 2.0 to 6.0, and a number average molecular weight (Mn) constituting the polydispersity index (PDI) of 10,000 to 100,000 g/mol.

4. A method for preparing the vinyl chloride-based block copolymer of claim 1 comprising:
   (a) preparing water-dispersible halogen-capping polyalkylacrylate by controlling a mean particle diameter of 3 halogen-capping, polyalkylacrylate to 0.1 to 1 μm; and
   (b) forming a block copolymer by polymerizing a vinyl chloride-based monomer using the water-dispersible halogen-capping polyalkylacrylate as a chain transfer agent.

5. The method according to claim 4, wherein, in step (b), the polymerization is carried out by adding water, a catalyst and the vinyl chloride-based monomer to an aqueous solution in which water-dispersible halogen capping polyalkylacrylate is dispersed.

6. The method according to claim 5, wherein the catalyst comprises one selected from diacylperoxides, peroxydicarbonates, sulfates and azo compounds, in the presence of at least one buffer selected from $NaHCO_3$, $Na_2HPO_4$, $NaH_2PO_4$, $CH_3COONa$, $KHCO_3$, $K_2HPO_4$, $KH_2PO_4$, $CH_3COOK$, $NH_4HCO_3$, $(NH_4)HPO_4$, $NH_4H_2PO_4$, and $CH_3COONH_4$.

7. The method according to claim 5, wherein peroxyester is used in the presence of a dispersing agent as the catalyst.

8. The method according to claim 5, wherein the polymerization is carried out by suspension polymerization at 20 to 90° C.

9. The vinyl chloride-based block copolymer according to claim 1, wherein the water-dispersible halogen-capping polyalkylacrylate is a water-dispersed emulsion comprising 5 to 70% by weight of the halogen-capping polyalkylacrylate and 95 to 30% by weight of water.

10. The vinyl chloride-based block copolymer according to claim 1, wherein the dispersing agent comprises at least one selected from the group consisting of a vinyl alcohol-based resin, cellulose and an unsaturated organic acid polymer.

11. The vinyl chloride-based block copolymer according to claim 1, wherein the number of carbon of alkyl groups in the polyalkylacrylate is 1 to 10.

12. The vinyl chloride-based block copolymer according to claim 1, wherein the halogen-capping is diiodine-capping.

* * * * *